(12) United States Patent
Herdendorf et al.

(10) Patent No.: US 11,966,617 B2
(45) Date of Patent: Apr. 23, 2024

(54) AIR GAPPED DATA STORAGE DEVICES AND SYSTEMS

(71) Applicant: Seagate Technology LLC, Fremont, CA (US)

(72) Inventors: Brett R Herdendorf, Mound, MN (US); Riyan Alex Mendonsa, Edina, MN (US); Krishnan Subramanian, Shakopee, MN (US); Kevin Lee Van Pelt, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 383 days.

(21) Appl. No.: 17/387,266

(22) Filed: Jul. 28, 2021

(65) Prior Publication Data

US 2023/0032300 A1    Feb. 2, 2023

(51) Int. Cl.
*G06F 3/06*        (2006.01)
*G05B 19/4155*    (2006.01)

(52) U.S. Cl.
CPC ....... *G06F 3/0655* (2013.01); *G05B 19/4155* (2013.01); *G06F 3/0604* (2013.01); *G06F 3/0676* (2013.01); *G05B 2219/40252* (2013.01)

(58) Field of Classification Search
CPC .... G06F 3/0604; G06F 3/0622; G06F 3/0655; G06F 3/0676; G06F 3/0679; G06F 3/0683; G06F 3/0686; G06F 3/0688; G06F 12/14; G06F 12/1433; G06F 21/00; G06F 21/12; G06F 21/121; G06F 21/123; G06F 21/55; G06F 21/554; G06F 21/561; G06F 21/606; G06F 21/78; G06F 21/79; G06F 21/80;

(Continued)

(56) References Cited

U.S. PATENT DOCUMENTS 6,701,456 B1 * 3/2004 Biessener ........... G06F 11/1471
                                                                                714/45
6,968,459 B1    11/2005 Morgan et al.
(Continued)

FOREIGN PATENT DOCUMENTS

CN          111742315 A      10/2020
EP           2684331 B1       4/2020
(Continued)

OTHER PUBLICATIONS

Sohail, M. et al., "Redesign backup strategies for next-gen data centers", 2019 Dell Technologies Proven Professional Knowledge Sharing Article, dated 2018, 28 pages.

(Continued)

*Primary Examiner* — Ilwoo Park
(74) *Attorney, Agent, or Firm* — Westman, Champlin & Koehler, P.A.

(57) ABSTRACT

A data storage blade includes a plurality of data storage cartridges, with each of the plurality of data storage cartridges comprising at least one data storage medium. The data storage blade also includes shared drive electronics (SDE) external to the plurality of data storage cartridges. The SDE is configured to control data access operations on different data storage cartridges of the plurality of data storage cartridges. The data storage blade further includes a controller-override mechanism activatable to disable communication between the SDE and the plurality of data storage cartridges.

20 Claims, 10 Drawing Sheets

(58) Field of Classification Search
CPC ....... G06F 21/82; G06F 21/85; G05B 19/414; G05B 19/4155; G05B 2219/40252; G05B 2219/40258
USPC .... 361/679.31–679.33, 679.37–679.39, 733, 361/736; 369/30.4–30.42, 30.46; 700/214, 245; 710/74, 301–304, 316; 726/26–28
See application file for complete search history.

(56) References Cited

U.S. PATENT DOCUMENTS

| | | | |
|---|---|---|---|
| 7,454,529 B2 * | 11/2008 | Stager | G06F 21/80 713/300 |
| 8,468,244 B2 | 6/2013 | Redlich et al. | |
| 8,984,275 B2 | 3/2015 | Ozgit | |
| 9,071,446 B2 | 6/2015 | Kreft | |
| 9,235,724 B2 | 1/2016 | Mevec et al. | |
| 9,461,826 B2 | 10/2016 | Kreft | |
| 9,832,222 B2 | 11/2017 | Hutton | |
| 9,893,898 B2 | 2/2018 | Kreft | |
| 10,171,251 B2 | 1/2019 | Kreft | |
| 10,242,234 B2 | 3/2019 | Allo | |
| 10,318,734 B2 | 6/2019 | Young et al. | |
| 10,398,060 B1 * | 8/2019 | Beall | H05K 7/1488 |
| 10,419,131 B2 | 9/2019 | Westmeyer et al. | |
| 10,491,467 B2 | 11/2019 | Wittenschlaeger et al. | |
| 10,534,417 B1 * | 1/2020 | Ortega Gutierrez | G06F 1/3268 |
| 10,536,846 B1 | 1/2020 | Hennessy et al. | |
| 10,615,989 B2 | 4/2020 | Kreft | |
| 10,742,493 B1 | 8/2020 | Kay et al. | |
| 10,803,206 B2 | 10/2020 | Allo | |
| 10,819,944 B2 | 10/2020 | Buddhavaram et al. | |
| 10,834,688 B1 | 11/2020 | Gan et al. | |
| 11,481,521 B2 | 10/2022 | Soffer | |
| 2007/0088981 A1 * | 4/2007 | Noble | H04B 17/0085 714/26 |
| 2010/0185846 A1 * | 7/2010 | Fukase | G06F 11/1417 713/2 |
| 2010/0250497 A1 | 9/2010 | Redlich et al. | |
| 2011/0150489 A1 | 6/2011 | Davidson et al. | |
| 2011/0243074 A1 | 10/2011 | Shin et al. | |
| 2013/0055338 A1 * | 2/2013 | McDougal | G06F 21/56 726/1 |
| 2014/0108786 A1 | 4/2014 | Kreft | |
| 2014/0156719 A1 * | 6/2014 | Leggette | G06F 3/067 709/201 |
| 2015/0161415 A1 | 6/2015 | Kreft | |
| 2016/0135318 A1 * | 5/2016 | Dean | G11B 23/28 361/679.33 |
| 2016/0359635 A1 | 12/2016 | Kreft | |
| 2016/0359636 A1 | 12/2016 | Kreft | |
| 2017/0222945 A1 | 8/2017 | Franca-Neto | |
| 2019/0140852 A1 | 5/2019 | Kreft | |
| 2020/0169860 A1 | 5/2020 | Dowlatkhah et al. | |
| 2020/0228351 A1 | 7/2020 | Kreft | |
| 2020/0285778 A1 | 9/2020 | Soffer | |
| 2021/0240622 A1 * | 8/2021 | Lea | G06F 11/3055 |
| 2022/0035901 A1 | 2/2022 | Yun | |

FOREIGN PATENT DOCUMENTS

| | | |
|---|---|---|
| WO | 2017132133 A1 | 8/2017 |
| WO | WO-2020067660 A1 * | 4/2020 |

OTHER PUBLICATIONS

U.S. Appl. No. 17/161,523, filed Jan. 28, 2021, 27 pages.

Alexander, J. et al., "New realms of measurement, connected data silos, and more in 2020 (Reader Forum)", RCR Wireless News, Retrieved from https://www.rcrwireless.com/20200310/opinion/new-realms-of-measurement-connected-data-silos-and-more-in-2020-reader-forum, dated Mar. 10, 2020.

"Gapwaves launches new 5G mmWave Phased Array Antenna", Press release from Gapwaves AB, retrieved from (cision.com), dated Feb. 10, 2020.

Requirement for Restriction-Election for U.S. Appl. No. 17/232,380, dated Nov. 16, 2023, 6 pages.

* cited by examiner

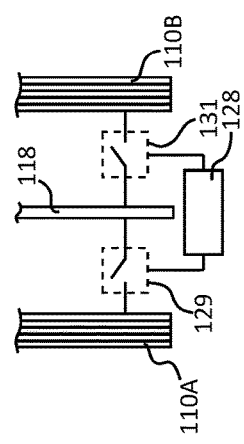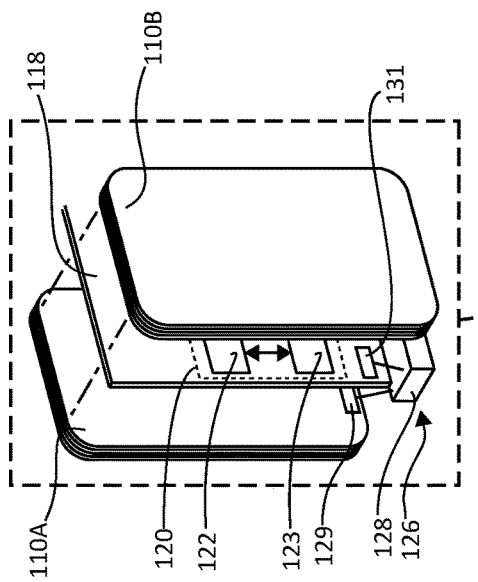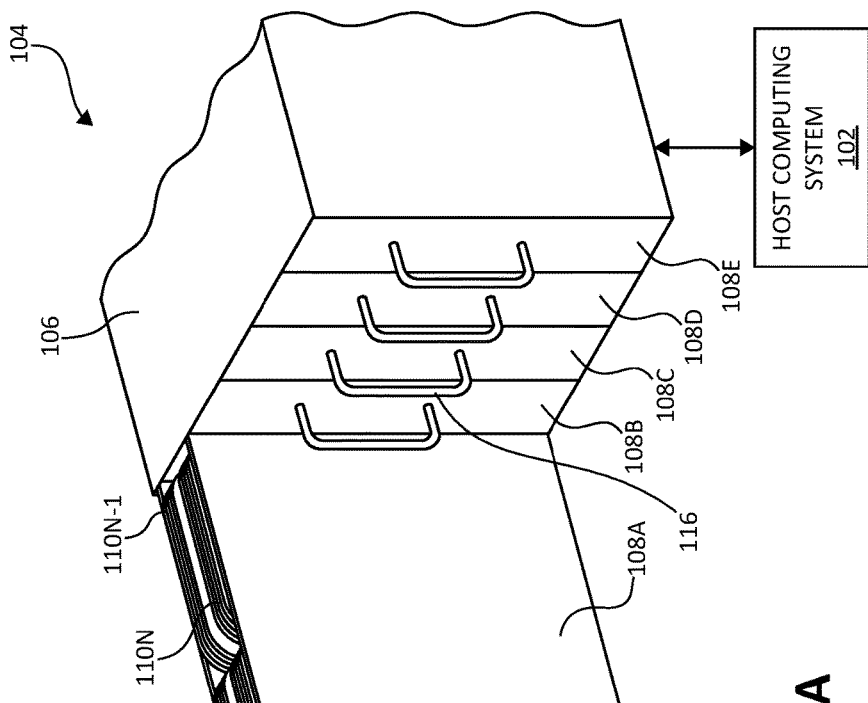

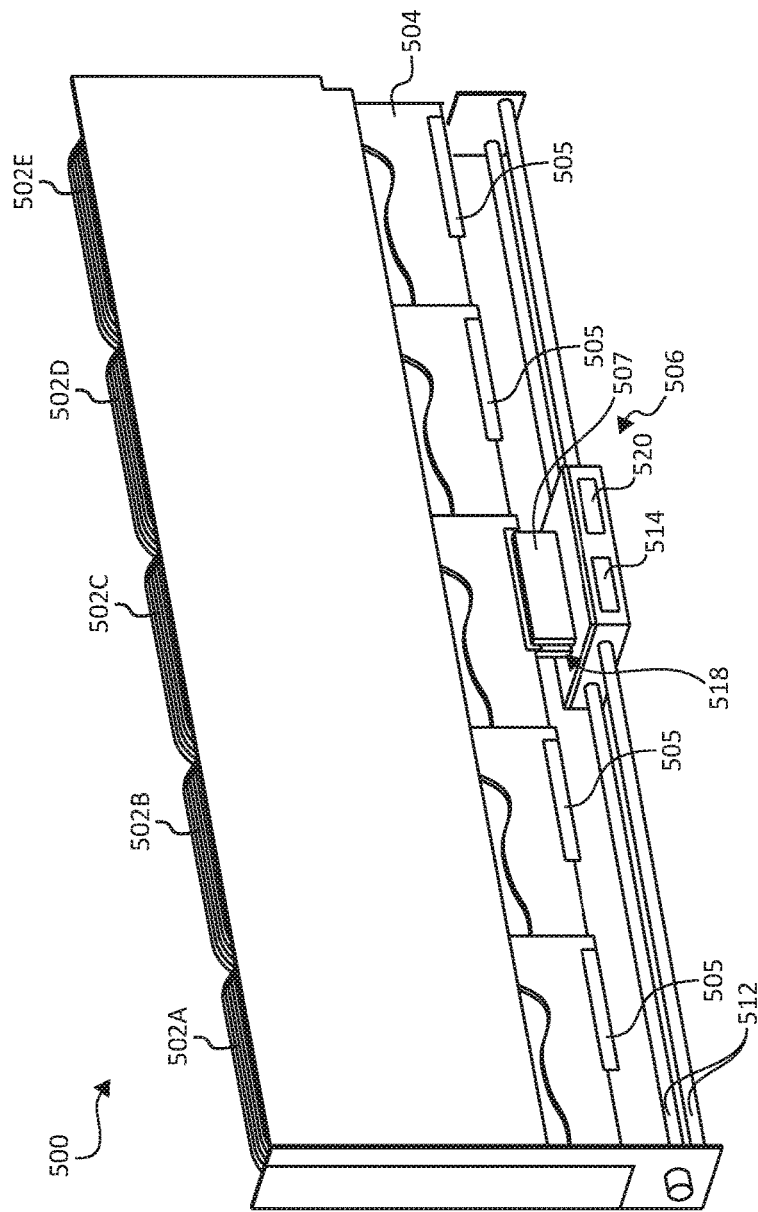
FIG. 5A
FIG. 5B
FIG. 5C

AIR GAPPED DATA STORAGE DEVICES AND SYSTEMS

SUMMARY

In one embodiment, a data storage blade is provided. The data storage blade includes a plurality of data storage cartridges, with each of the plurality of data storage cartridges comprising at least one data storage medium. The data storage blade also includes shared drive electronics (SDE) external to the plurality of data storage cartridges. The SDE is configured to control data access operations on different data storage cartridges of the plurality of data storage cartridges. The data storage blade further includes a controller-override mechanism activatable to disable communication between the SDE and the plurality of data storage cartridges.

In another embodiment, a data storage blade is provided. The data storage blade includes a plurality of data storage devices, with each of the plurality of data storage devices comprising at least one data storage medium. The data storage blade also includes control electronics configured to control data access operations on at least one data storage device of the plurality of data storage devices. The data storage blade further includes a controller-override mechanism activatable to disable communication between the control electronics and the at least one data storage device of the plurality of data storage devices.

In yet another embodiment, a method is provided. The method includes providing a plurality of data storage cartridges, with each of the plurality of data storage cartridges comprising at least one data storage medium. The method also includes securing the plurality of data storage cartridges to a data storage blade support, and disconnectably coupling shared drive electronics (SDE) to the plurality of data storage cartridges. The SDE is configured to control data access operations on different data storage cartridges of the plurality of data storage cartridges. The method further includes providing a controller-override mechanism activatable to disable communication between the SDE and the plurality of data storage cartridges.

This summary is not intended to describe each disclosed embodiment or every implementation of the air gapped data storage devices and systems. Many other novel advantages, features, and relationships will become apparent as this description proceeds. The figures and the description that follow more particularly exemplify illustrative embodiments.

BRIEF DESCRIPTION OF THE DRAWINGS

FIG. 1A illustrates a storage and computing system in which air-gapped security may be employed in accordance with one or more aspects of the present disclosure.

FIG. 1B is an exploded view of a portion of the storage and computing system of FIG. 1A.

FIG. 1C is a schematic side view of the portion of the storage and computing system shown in FIG. 1B.

FIG. 5A is a perspective view of a data storage blade in which a printed circuit board with shared electronics is robotically propellable to a particular position for accessing an identified/selected data storage cartridge in accordance with one embodiment.

FIG. 5B is a schematic sectional view of a portion of the data storage blade of FIG. 5A showing carriage interconnects in an engaged position.

FIG. 5C is a schematic sectional view of a portion of the data storage blade of FIG. 5A showing carriage interconnects in a disengaged position.

DETAILED DESCRIPTION

Figure 2A:
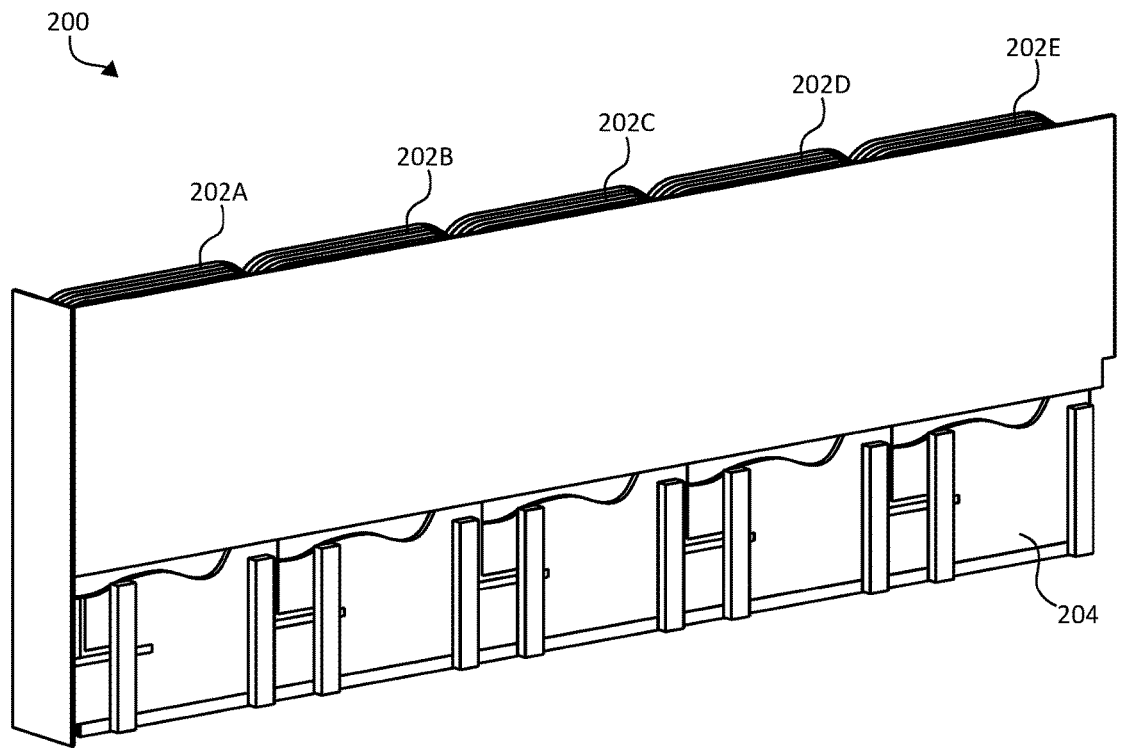
FIG. 2A is a rear perspective view of a data storage blade in which air-gapped security may be employed in accordance with one or more aspects of the present disclosure.

Embodiments of the disclosure generally relate to providing data protection in data storage devices and systems. More specifically, embodiments of the disclosure provide "air-gapped" solutions (also referred to herein as "controller-override mechanisms") that function to isolate and protect user data from the data storage device's/system's own internal firmware/software in the event that the firmware/software becomes compromised.

In some embodiments, the data storage devices may include data storage discs (e.g., magnetic or optical data storage discs). Certain embodiments may employ data storage cartridges that include data storage discs. The term "data storage cartridges" is used herein to refer to an exemplary type of portable storage drive lacking an independent set of read/write controls. By example and without limitation, the exemplary data storage cartridges described herein are shown to resemble conventional hard disc drives (HDDs) but without certain mechanical and electrical features that would otherwise serve to enable the cartridge to operate in a stand-alone fashion. Each data storage cartridge may, for example, generally assume the form of an HDD minus control electronics and, in some cases, other elements that can be offloaded from the cartridge, and supplied by control electronics on a separate printed circuit board (PCB). The control electronics (also referred to herein as shared drive electronics (SDE)) may be shared by multiple data storage cartridges. The removal of the elements from the individual cartridges and the sharing of the same control electronics across multiple cartridges allows the provisioning of a large-scale, high-capacity storage system with the benefits of disc storage at a significantly lower cost. In some implementations, the data storage cartridges may include solid state drive (SSD)-based storage media (in addition to, or instead of, data storage discs) with read/write control electronics removed and included on a PCB, such that the electronics may be shared amongst multiple such data storage cartridges. As will be described in detail further below, when firmware/software utilized by controller electronics in the SDE becomes compromised, the SDE is electrically and/or physically separated/disconnected from the data storage cartridges to protect data stored in the data storage cartridges. Prior to providing details regarding the different embodiments, a description of an illustrative operating environment is provided below.

FIG. 1A shows an illustrative operating environment in which certain specific embodiments disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that like reference numerals are sometimes used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1A illustrates a storage and computing system 100 in which air-gapped security may be employed in accordance with one or more aspects of the present disclosure. System 100 includes a host computing system 102 and a data storage system 104.

Host computing system 102 represents any type of computing system that is configured to read data from and write data to one or more data storage devices. Examples of host computing system 102 include cloud computing environments, servers, desktop computers, laptop computers, mobile phones, tablet computers, televisions, automobiles, surveillance cameras, or any other type of mobile or non-mobile computing device that is configured to read and write data. Host computing system 102 may be connected to data storage system 104 by a wired or wireless connection.

Data storage system 104 includes a housing or casing 106 within which a plurality of blades or sleds (e.g., 5 blades/sleds 108A-108E) are included. Different embodiments may have different numbers of blades 108. Each blade 108 houses a plurality of data storage cartridges 110A-110N. In general, any number of data storage cartridges may be included in a blade 108. Blades 108 are configured to slide into and out of a stowed position within housing/casing 106. The blades 108 may be accessible from one or more ends or sides of casing 106, and each blade 108 may include one or more handles 116 to enable withdrawal/removal from the casing 106. An inside of the casing 106 may include rails (not shown) or other equivalent features to enable smooth movement of the blades 108 during insertion into, or withdrawal from, the casing 106. Upon withdrawal of the blade 108, the data storage cartridges 110 within that blade 108 may be removed (e.g., for servicing, archiving, etc.).

The data storage cartridges 110 in data storage system 104 lack individual read/write control electronics and instead share control electronics integrated on a PCB 118 (shown in enlarged view 1B) within each blade 108. It should be noted that, although a single PCB 118 is shown in enlarged view 1B, two PCBs positioned back to back may be employed. Here, one PCB will be employed to support SDE associated with a first row 124A of data storage cartridges 110 and the other PCB will be employed to support SDE associated with a second row 124B of data storage cartridges 110.

In general, data storage cartridges 110 are coupled to shared control electronics 120 on PCB 118. These shared control electronics 120 execute read and write commands targeting the various data storage cartridges 110 responsive to receiving such commands from host 102. In one implementation, the PCB 118 supports a shared storage drive controller 122 operable to read from and write to the data storage cartridges 110, and may additionally support volatile memory and/or secondary non-volatile memory (e.g., storing firmware) 123 used by the drive storage controller 122 to carry out read and write operations. In the embodiment shown in FIGS. 1A and 1B, data storage cartridges 110 are shown in two rows 124A and 124B with the PCB 118 between the rows 124A and 124B. However, in some embodiments, which are described further below, a single row of data storage cartridges 110 may be employed with the PCB 118 and shared control electronics 120 positioned in any suitable location within the blade 108. In general, any suitable arrangement of cartridges and shared electronics within a blade may be employed in different embodiments.

As can be seen in FIG. 1B, which is an exploded view of an interior portion of blade 108A, blade 108A (in general, each blade) additionally includes (or is coupled to) a controller-override mechanism 126 that includes a switch controller 128. Switch controller 128 may be located anywhere within, on, or separate from, blade 108A. To activate the controller-override mechanism 126, a user manually or electrically alters a state of the switch controller 128, breaking a physical and/or electrical connection between the data storage cartridges (sometimes collectively referred to herein as the data storage cartridge bank) 110 and the PCB 118, with the shared control electronics 120 thereon. For example, a user may activate the controller-override mechanism 126 by turning a knob, inserting a key, or pressing a button on a physical interface of the data storage system 104. Alternatively, the user may activate the controller-override mechanism 126 by inputting an electrical signal to the data storage system 104, such as by coupling a handheld mobile device to a side-channel electrical interface of the data storage system 104 and by using the mobile device to generate a safeguard user data signal that causes the switch controller 128 to break the physical and/or electrical connection between the data storage cartridge bank 110 and the PCB 118. In general, any suitable technique may be employed for activating the switch controller 128 may be employed.

Within the blade 108A, the electrical and/or physical separation between the PCB 118 and the data storage cartridge bank 110 may be achieved in a variety of different ways. In one implementation, the switch controller 128 opens one or more electrical switches (e.g., switches 129 and 131, which are schematically shown in FIG. 1C) coupling the PCB 118 to the storage cartridge bank 110. In another implementation, which may be more suitable for blades 108 that employ a single row of cartridges 110, the switch controller 128 (or other switching element) may apply a force that physically "pushes" the data storage cartridge bank 110 away from the PCB 118 (or pushes the PCB 118 away from the data storage cartridge bank 110), temporarily breaking the electrical coupling between the two. In either scenario, electrical connections between the PCB 118 and the storage cartridge bank 110 are temporarily severed in a manner that prevents the shared control electronics 120 on the PCB 118 from carrying out read and write operations to the data storage cartridges 110 within blade 108 until such time that the severed connections are re-established, such as when a user performs a second manual action to return the switch controller 128 to its original state. In some embodiments, switch controller 128 may be electrically activated to return to its original state.

Figure 2B:
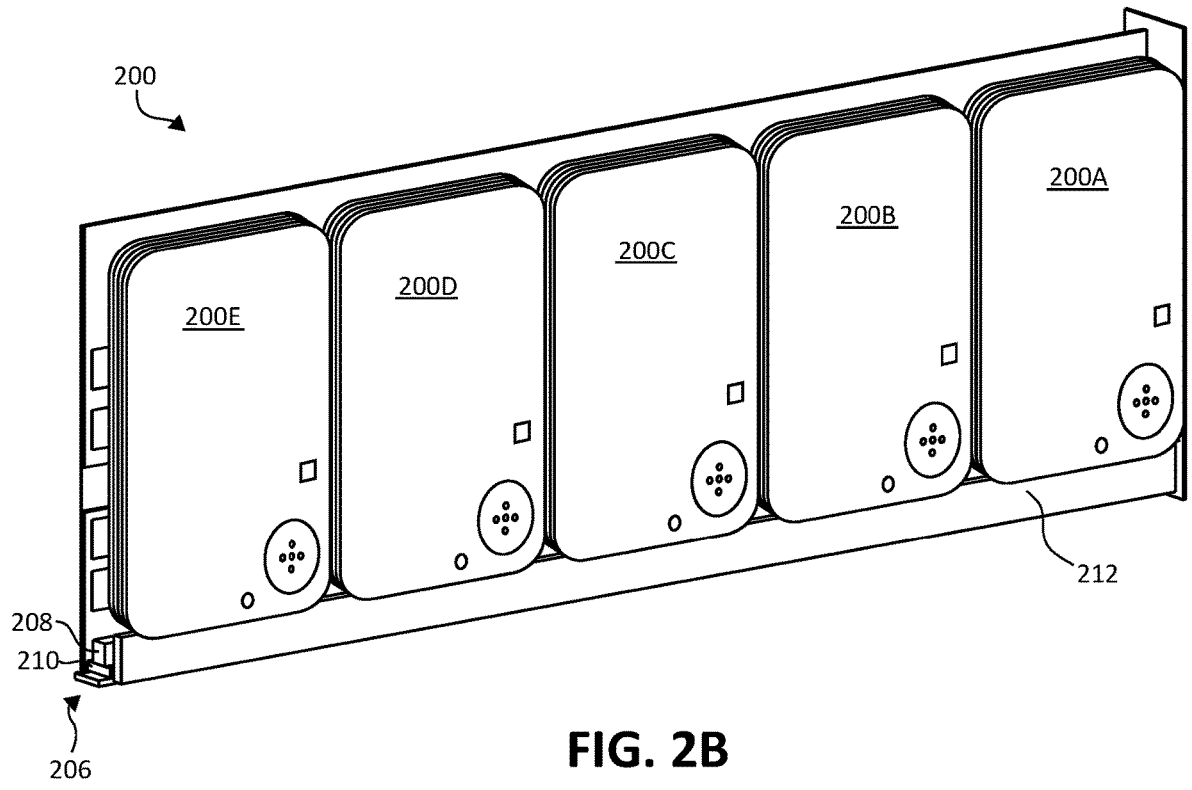
FIG. 2B is a front perspective view of the data storage blade of FIG. 2A.
Figure 2C:
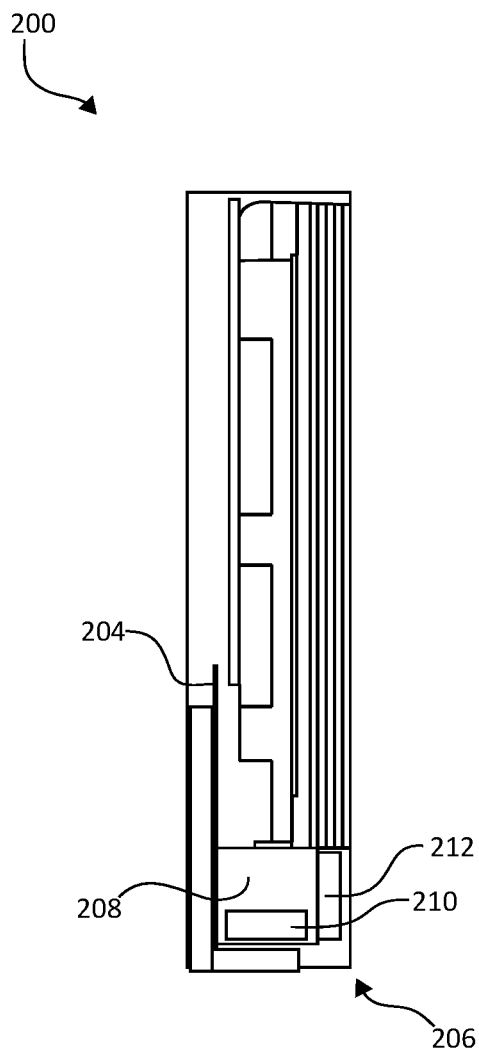
FIG. 2C is a side elevation view of the data storage blade of FIG. 2A.

FIGS. 2A, 2B and 2C are rear perspective, front perspective, and side elevation views, respectively, of a data storage blade 200 in which air-gapped security may be employed in accordance with one or more aspects of the present disclosure.

In some embodiments, data storage blade 200 is configured to be insertable into, and removable from, a housing of a chassis (not shown in FIGS. 2A-2C). In such embodiments, the data storage blade 200 is configured to communicatively couple (via any suitable interface circuitry) with chassis circuitry, and thereby forms a storage subsystem within the chassis data storage system. In other embodiments, data storage blade 200 may be a stand-alone storage unit with suitable interface circuitry, which enables direct connection to a host computer. In general, a data storage blade 200 may be configured to communicatively couple with external devices via an interface (not shown), such as a serial advanced technology attachment (SATA) interface, a serial attached small computer system interface (SAS), a peripheral component interconnect express (PCIe) interface, a universal serial bus ("USB") interface, or any other type of interface suitable for data storage communication. In some embodiments, the interface may comprise a plurality of data communication interfaces, such as dual-ported SAS or multiple PCIe links, for example to provide redundancy or to improve performance.

Data storage blade 200 may include metal (e.g., aluminum, stainless steel, or other metal), glass-reinforced epoxy laminate material, and/or other rigid material. Data storage blade 200 is configured to hold or support a plurality of data storage cartridges 202 (similar to data storage cartridges 110 of FIG. 1). However, unlike the two rows of data storage cartridges 110 within a blade 108 in FIG. 1, blade 200 includes a single row of data storage cartridges 202. Although FIG. 2 shows blade 200 with 5 data storage cartridges 202A-202E, blade 200 may be configured to hold any number (e.g., 8, 10, 12, etc.) of data storage cartridges 202.

As in the case of data storage cartridges 110 of FIG. 1, data storage cartridges 202 within blade 200 lack individual read/write control electronics and instead share control electronics integrated on a PCB 204 (shown in FIGS. 2A and 2C). Data storage cartridges 202 are coupled to shared control electronics (not shown) on PCB 204, which may also include one or more memories (e.g., read-only memory (ROM)) and other circuitry/adaptive features.

Referring also to FIGS. 2B-2C, data storage blade 200 additionally includes a controller-override mechanism 206 that includes a solenoid 208 and a solenoid controller 210. It should be noted that use of a solenoid 208 with a solenoid controller 210 is only one example, and, in general, any suitable mechanism for temporarily disconnecting PCB 204 from data storage cartridges 202 may be employed. Solenoid controller 210 may be located anywhere within, on, or separate from, blade 200. In one embodiment, a user may activate the controller-override mechanism 206 by turning a knob, inserting a key, or pressing a button on a physical interface (not shown) of data storage blade 200. In response to the activation of the physical interface, solenoid controller 210 may be activated, and, in response to the activation, may adjust a current provided to a coil of the solenoid 208, such that a magnet of the solenoid pushes the PCB 204 away from the data storage cartridges 202, thereby causing the disconnection of elements 202 and 204. Horizontal bar 212, which may be formed of any suitable material, holds the solenoid 208 in place, and prevents movement of the solenoid 208 outwardly beyond bar 212. Once any problems related to unauthorized access to firmware/software within the data storage blade 200 are addressed, the connection between the PCB 204 and the data storage cartridges 202 may be re-established by, for example, the user performing a second manual action that results in the solenoid controller 210 returning the solenoid 208 to its original position (e.g., the PCB 204 in contact with the data storage cartridges 202).

Figure 3A:
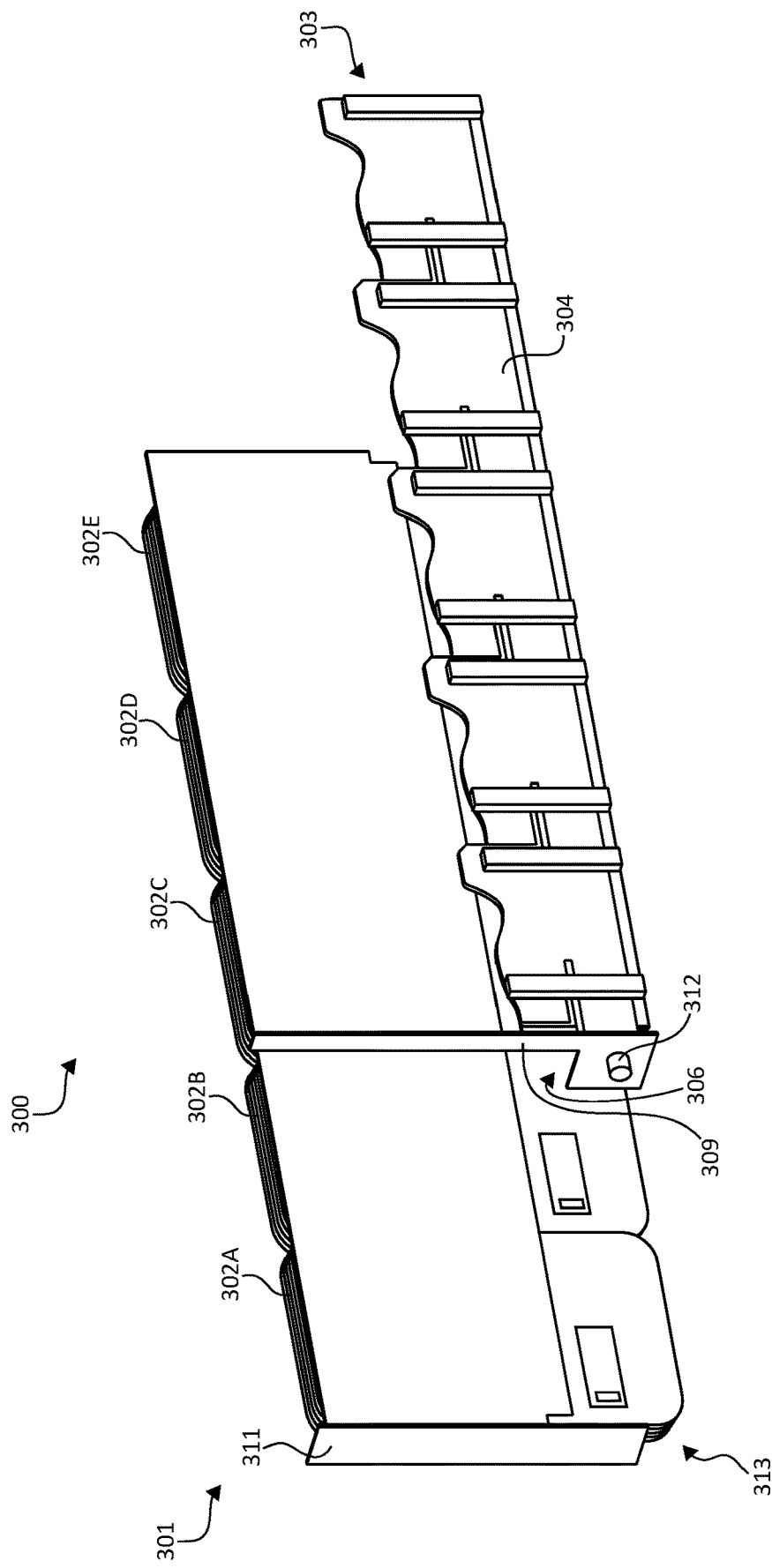
FIG. 3A is an exploded view of a data storage blade that includes first and second detachable portions in accordance with one embodiment.

FIG. 3A is an exploded view of a data storage blade 300 that includes a detachable PCB and controller-override mechanism in accordance with one embodiment. Most of the elements of data storage blade 300 are substantially similar to the elements of data storage blade 200, and therefore, in the interest of brevity, descriptions of the similar elements are not repeated. As can be seen in FIG. 3A, data storage blade 300 includes a first portion 301 and a second portion 303, which may be detachably coupled to the first portion 301. First portion 301 includes multiple data storage cartridges 302 (e.g., 5 data storage cartridges 302A-302E). However, in different embodiments, any suitable number of data storage cartridges may be employed. Second portion 303 includes a PCB 304 on which shared control electronics (not shown) are mounted. Second portion 303 additionally includes a controller-override mechanism 306 that may be similar to controller-override mechanism 208 of FIGS. 2A-2C in some embodiments. In general, any suitable controller-override mechanism may be employed.

First portion 301 and second portion 303 may be releasably attached in any suitable manner. In one embodiment, one of portions 301 and 303 may include a slot (not shown) and the other one of portions 301 and 303 may include a tab (not shown) that fits into the slot. In such an embodiment, second portion 303 may be separated from first portion 301 by, for example, pulling apart "L-shaped" portion 309 from rectangular portion 311 at end 313 of data storage blade 300.

Figure 3B:
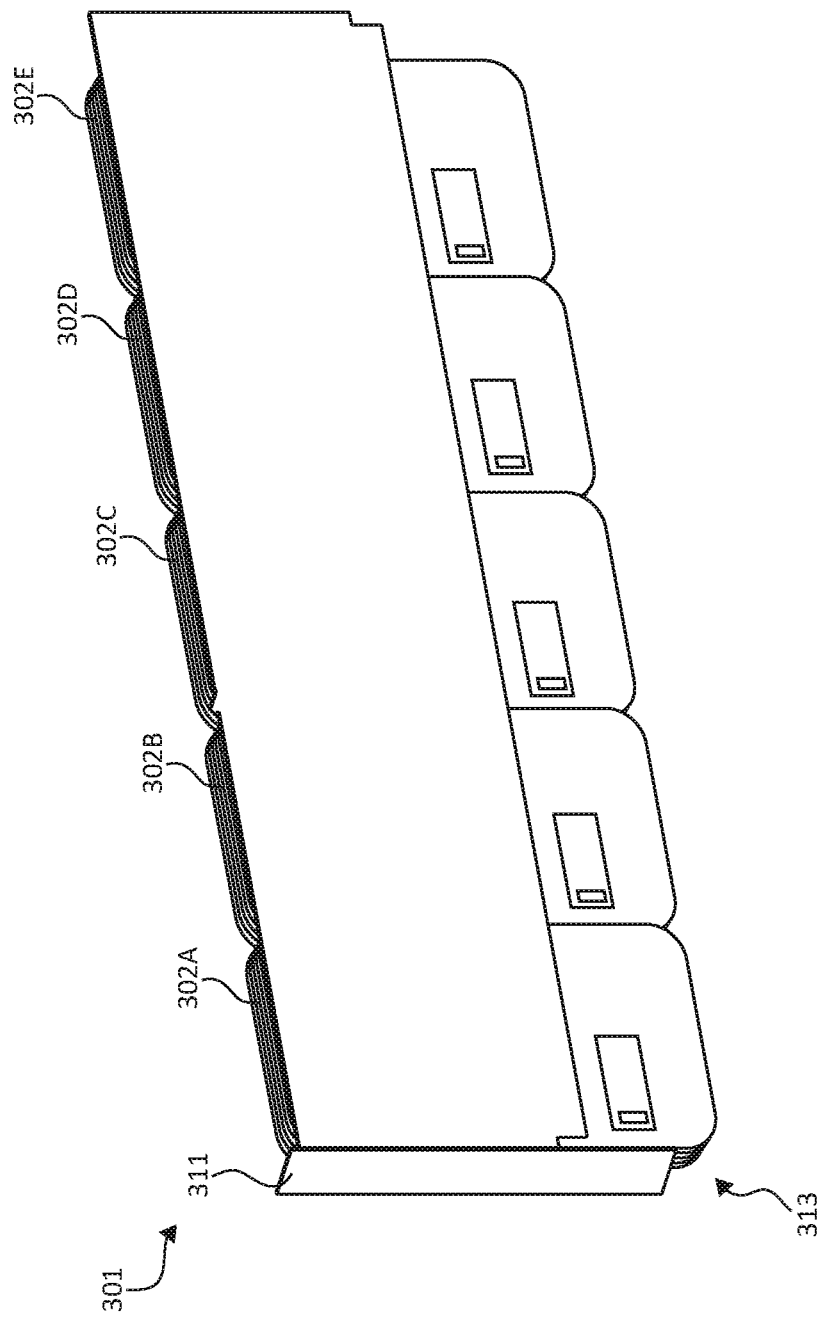
FIG. 3B is a perspective view of the first detachable portion of the data storage blade of FIG. 3A.
Figure 3C:
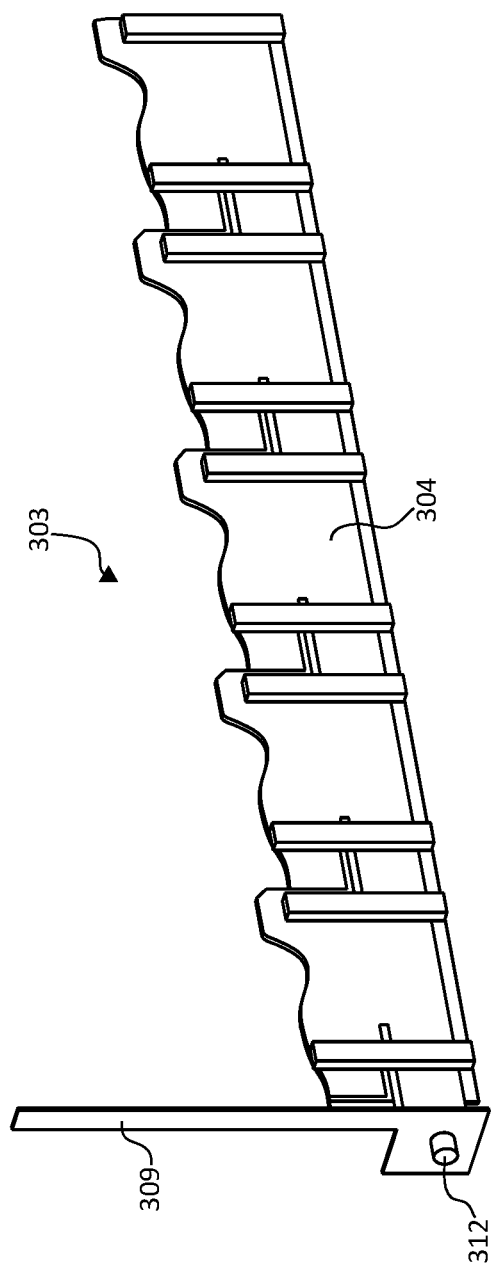
FIG. 3C is a perspective view of the second detachable portion of the data storage blade of FIG. 3A.

In another embodiment, first portion 301 or second portion 303 may include a button 312, which, when pressed, causes latching elements (not shown) in portions 301 and 303 to release, thereby releasing second portion 303 from first portion 301. FIGS. 3B and 3C show portions 301 and 303, respectively. In general, the embodiment of FIG. 3 provides a serviceable blade 300 setup with air-gap features in controller-override mechanism 306.

In some implementations of the embodiments described above in connection with FIGS. 1-3, the SDE includes a single system on a chip (SoC) configured to communicate with any one data storage cartridge of a plurality of data storage cartridges at a time. In other implementations of those embodiments, the SDE includes multiple SoCs with each different SoC of the multiple SoCs configured to communicate with a different data storage cartridge of the plurality of data storage cartridges in parallel.

Figure 4A:
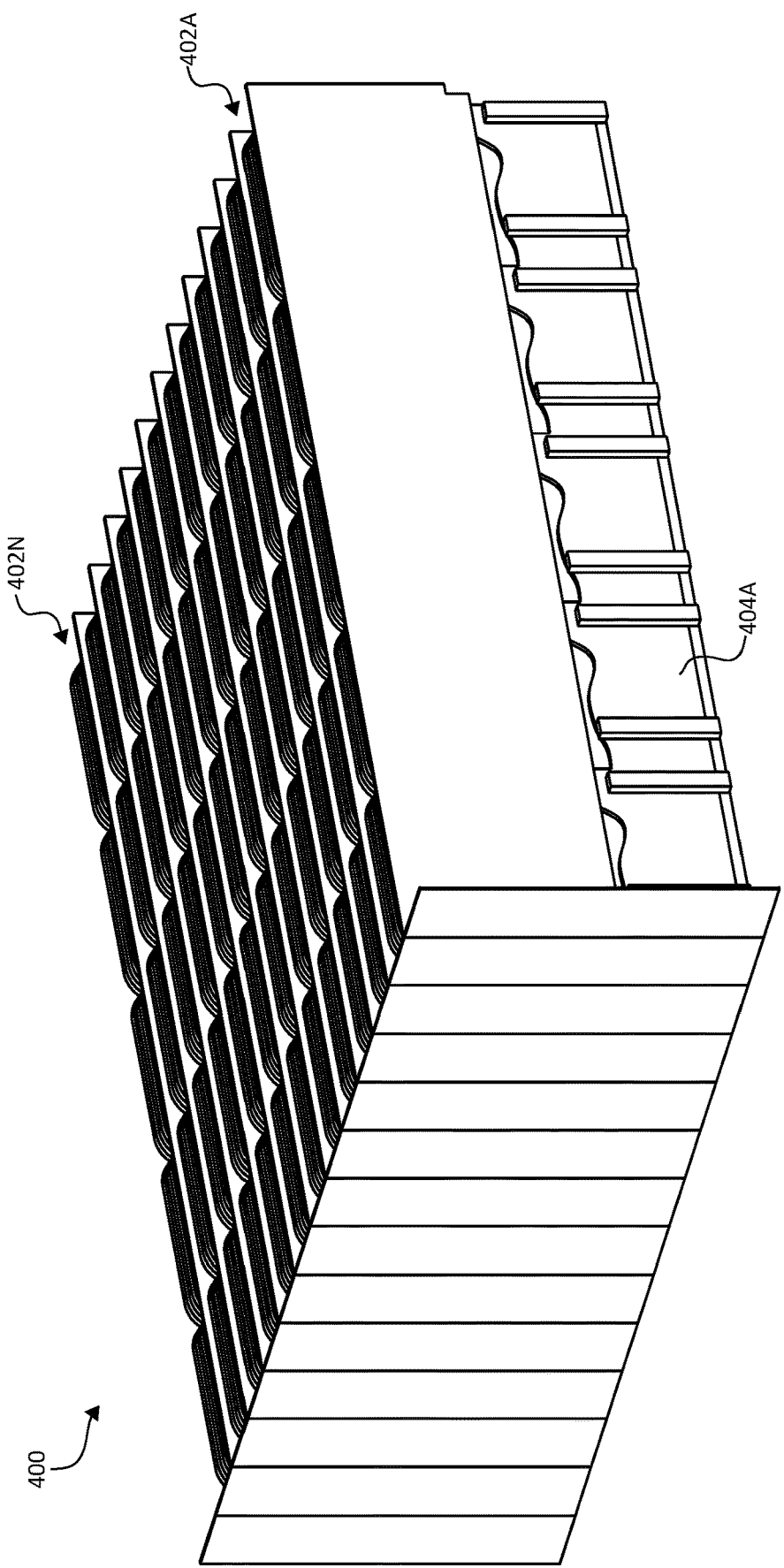
FIG. 4A is a perspective view of a data storage chassis that includes a plurality of data storage blades in accordance with one embodiment.

FIG. 4A is a perspective view of a data storage chassis 400 that includes a plurality of data storage blades 402A-402N of the type described above in connection with FIG. 1A-1B, 2A-2C or 3A-3C, with each data storage blade 402 including a PCB 404A with SDE. Chassis 400 may include a chassis controller (not shown) that may facilitate selective communication between a host computing system (not shown in FIG. 4A) and a particular data storage blade 402 (or a particular data storage cartridge within data storage blade 402). In operation, the chassis controller may transmit data access commands (e.g., read and/or write commands) to a particular data storage blade 402. The data access commands may specify target logical block addresses (LBA), object name, or file and offset, for executing associated data access operations, depending upon the storage protocol used. Responsive to receiving a data access command, the data storage blade 402 may identify one or more physical data storage cartridges that correspond to the target data using a stored mapping, such as a logical-to-physical block map. Upon completion of the data access command, the data storage blade may communicate back to the host computing system via the chassis controller.

When unauthorized access to the data storage chassis 400 is detected, a user may activate a blade-level controller-override mechanism (such as 126 of FIG. 1, 206 of FIG. 2 or 306 of FIG. 3) of a particular data storage blade 402 that is currently active. Alternatively, the user may activate a chassis-level controller-override mechanism (not shown) to which the chassis controller may respond by placing the chassis 400 in a "security comprised" state, and sending a disconnect signal to the currently-active data storage blade 402 so that the controller-override mechanism of that data storage blade 402 can carry out the disconnection. The chassis controller may also enable a manual reset feature, which may be physically activated by the user to place the chassis 400 back in its normal operating mode after any problems are addressed.

A primary heat source in a data storage device is electrical circuitry included on a PCB that is coupled to the data storage device (e.g., a data storage cartridge). In the embodiments described above, the PCB is located on sides of data storage cartridges in a data storage blade, and therefore, when multiple data storage blades of the types shown in FIGS. 1A-3C are positioned as shown in data storage chassis 400, heat is generated between the blades that have vertically positioned PCBs. Fans or other suitable equipment may be utilized in the chassis for cooling. However, vibrations from cooling equipment such as fans occupy space, and may contribute to vibration, which may negatively impact data storage cartridge performance.

Figure 4B:
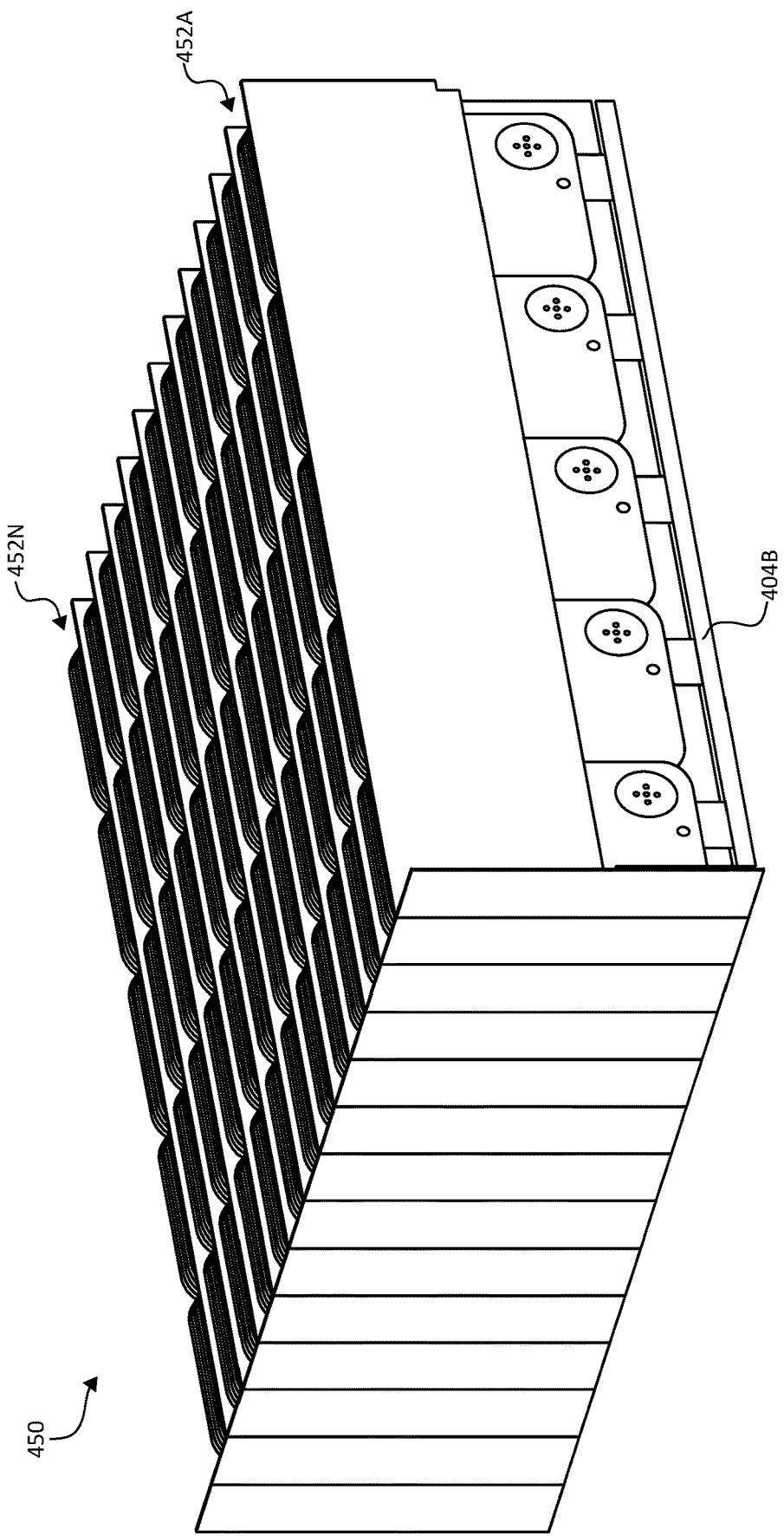
FIG. 4B is a perspective view of a data storage chassis that includes a plurality of data storage blades in accordance with another embodiment.

To improve cooling efficiency, in some embodiments, PCBs with SDE may be included below the data storage cartridges on each blade. This provides a separate plane and channel for cooling that does not have interference from the cartridges/drives. FIG. 4B illustrates such an embodiment in which a chassis 450 includes data storage blades 452A-452N, with each data storage blade 452 including a PCB 404B with SDE positioned below the data storage cartridges. In other respects, data storage chassis 450 operates in a substantially similar manner to data storage chassis 400 of FIG. 4A. Positioning of the PCB below the data storage cartridge may be referred to as a "toast" architecture. It should be noted that the toast architecture may be applied at the chassis-level, blade-level and/or single drive-level. In the embodiment of FIG. 4B, cooling may be applied below PCB 404B.

FIG. 5A is a perspective view of a data storage blade 500 in which a PCB with shared electronics is robotically propellable to a particular position for accessing an identified/selected data storage cartridge in accordance with one embodiment. Data storage blade 500 includes multiple data storage cartridges 502 (e.g., 5 data storage cartridges 502A-502E) with an interposer board 504 coupled to each of the data storage cartridges 502. In general, any suitable number of data storage cartridges 502 may be employed in different embodiments.

As an be seen in FIG. 5A, a moveable carriage 506 is positioned below the data storage cartridges 502. The moveable carriage 506 includes a PCB 508 that may have shared control electronics and one or more memories including firmware executable by the shared control electronics. The shared control electronics may be detachably coupled to an interposer board 504 of any data storage cartridge 502 with the help of an interconnect mechanisms (e.g., drive interconnects 505, which are included on each data storage cartridge, and carriage interconnects 507 coupled to the shared control electronics on the carriage 506). In the embodiment of FIG. 5A, moveable carriage 506 is propelled along rails 512 by one or more motors 514. Examples of motors 514 include a brushless motor, a brushed motor, a direct drive motor, linear motor, servo motor, stepper motor, etc. Motor 514 and other components on carriage 506 may receive power via a flex circuit 516. In general, power may be provided using any suitable technique, including wireless power delivery. When a particular data storage cartridge 502 is selected for data access by, for example, control circuitry within the data storage blade 500 or external to the data storage blade 500 (e.g., by a chassis controller), motor control circuitry (not shown), which may be within the data storage blade 500, directs the motor 514 to move the carriage 506 to the selected data storage cartridge (e.g., data storage cartridge 502D). The motor may be energized, and may move the carriage 506 to, for example, the selected data storage cartridge (e.g., 502D), and may be aided by position detection circuitry (not shown) to bring the carriage 506 to the appropriate location under data storage cartridge 502D. Details regarding coupling of shared electronics to the data storage cartridge (e.g., 502D) are provided below in connection with FIG. 5B.

FIG. 5B is a schematic sectional view of a portion of data storage blade 500 showing carriage interconnects 507 in an engaged position. When carriage interconnects 507 are in the engaged position, carriage interconnects 507 communicatively and mechanically couple to drive interconnects 505 which allows data access operations (e.g., writing or reading of data) at data storage cartridge 502. In some instances, carriage interconnects 507 are configured to open and close.

In such instances, carriage interconnects 507 may close and clamp onto drive interconnect 505 when carriage interconnects 507 are in the engaged position. For instance, carriage interconnects 507 may include a shaped memory alloy (SMA) that opens carriage interconnects 507 in response to receiving an electrical current and closes carriage interconnects 507 in the absence of an electrical current.

In the engaged position shown in FIG. 5B, and when, for example, a host is transmitting/receiving data through a wired or wireless connection to data storage cartridge 502D, unauthorized access to the host or data storage blade 500 may be detected. Upon detection of the unauthorized access, a controller-override mechanism 518 including a switch controller 520 may be activated in any suitable manner (e.g., as described above in connection with FIGS. 1A-1B and 2A-2C). Upon activation of the switch controller 520, a disengage signal may be sent by switch controller to carriage interconnects 507, resulting in the interconnects 507 being opened. The disengaged or open state is shown in FIG. 5C.

Figure 6:
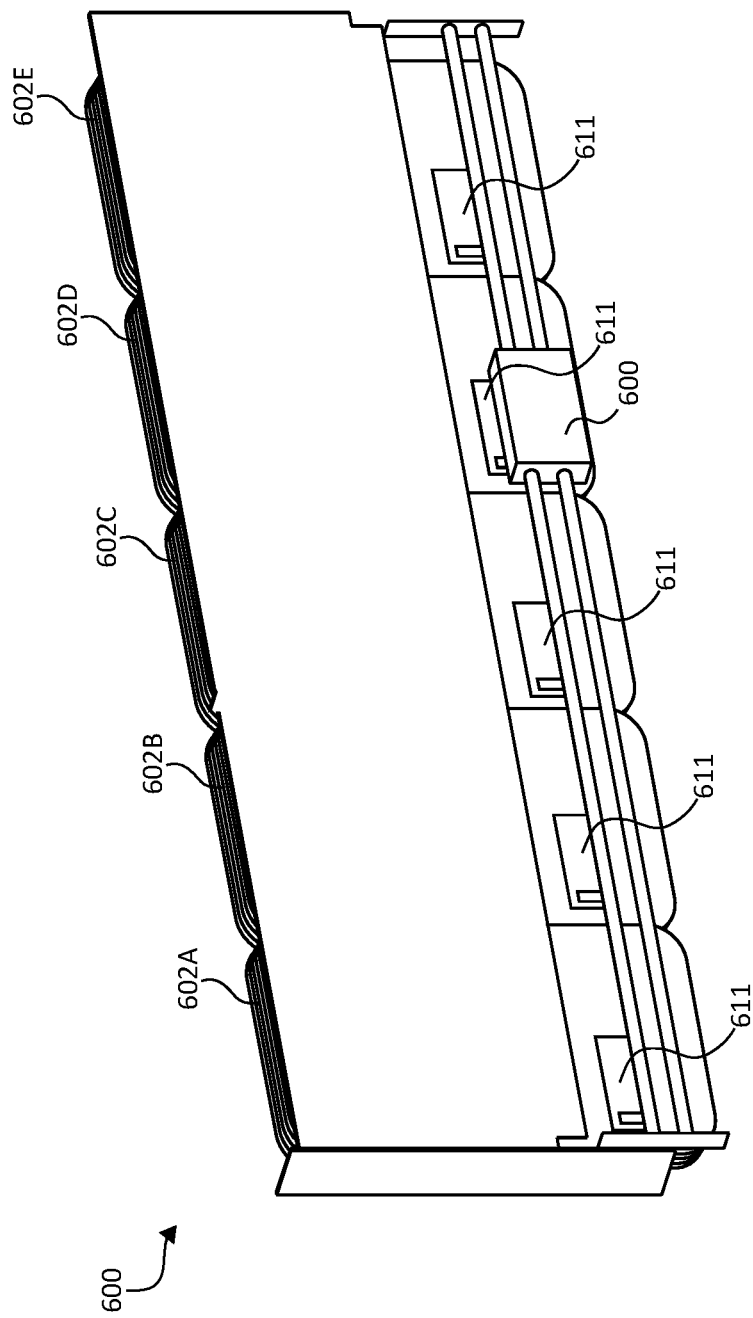
FIG. 6 is a perspective view of a data storage blade in which a printed circuit board with shared electronics is robotically propelled to a particular position for accessing an identified/selected data storage cartridge in accordance with another embodiment.

FIG. 6 is a perspective view of a data storage blade 600 in which a PCB with shared electronics is robotically propelled to a particular position for accessing an identified/selected data storage cartridge in accordance with another embodiment. In general, data storage blade 600 is substantially similar to data storage blade 500 of FIG. 5A. However, in data storage blade 600 there are no interposer boards such as 504 of FIG. 5A. Instead, moveable carriage 606 is positioned such that a carriage interconnect (not shown) directly releasably couples to bulkhead connectors 611 on data storage device cartridges 602 (e.g., 602A-602E). In data storage blade 600, data access operations and air gap security are provided in a manner described above in connection with FIGS. 5A-5C, and therefore, in the interest of brevity, the description of similar elements and operations is not repeated in connection with FIG. 6.

The embodiment of FIG. 6 shows one row of data storage cartridges 602 in data storage blade 600. However, in some embodiments, a second row of data storage cartridges may be included in the data storage blade, and the two rows of data storage cartridges may be arranged as shown in data storage blade 108 of FIG. 1A. With such an arrangement, first and second SDE may be mounted on opposing first and second sides of a carriage of a robotics system positioned between the first and second rows of data storage cartridges. The carriage may include a first carriage interconnect coupled to the first SDE and configured to couple to a drive interconnect of a selected data storage cartridge in the first row of data storage cartridges, and a second carriage interconnect coupled to the second SDE and configured to couple to a drive interconnect of a selected data storage cartridge in the second row of data storage cartridges. This enables a same robotics system to be utilized for carrying out data access operations on multiple rows of data storage cartridges, thereby resulting in cost savings. It should be noted that, in some embodiments, single SDE may be utilized to couple any selected data storage cartridge of the first or second rows of data storage cartridges.

The above-described embodiments includes data storage blades with data storage cartridges with SDE configured to control data access operations on the data storage cartridges, In alternate embodiments, data storage blades may include a plurality of data storage drives (e.g., HDDs) instead of data storage cartridges with separate SDE. In such embodiments, each drive (e.g., HDD) has its own control electronics that are disconnectable from, for example, a head disc assembly (HDA) of the HDD by activation of a switch (e.g., a solenoid positioned between the control electronics and the HDA) in a manner described earlier to provide air-gapped security.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments include more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:
1. A data storage blade comprising:
 a plurality of data storage cartridges, with each of the plurality of data storage cartridges comprising at least one data storage medium;
 shared drive electronics (SDE) external to the plurality of data storage cartridges, the SDE configured to control data access operations on different data storage cartridges of the plurality of data storage cartridges, wherein the SDE comprises firmware or software utilized to access data from the plurality of data storage cartridges, thereby physically separating storage of the firmware or software from the plurality of data storage cartridges that are configured to store user data; and a controller-override mechanism activatable to disable communication between the SDE and the plurality of data storage cartridges in response to a detection of the firmware or software being compromised, wherein the control-override mechanism is manually activatable on the data storage blade to re-enable communication between the SDE and the plurality of data storage cartridges.

2. The data storage blade of claim 1 and wherein the controller override mechanism comprises a switch, and wherein the SDE and the switch are included in a single physical unit that is configured to detachably couple to the plurality of data storage cartridges.

3. The data storage blade of claim 1 and further comprising a robotics system configured to move the SDE to a selected data storage cartridge of the plurality of data storage cartridges.

4. The data storage blade of claim 3 and wherein:
each data storage cartridge of the plurality of data storage cartridges comprises an interposer board and a drive interconnect coupled to the interposer board; and
the robotics system comprises a carriage interconnect coupled to the SDE, the carriage interconnect configured to detachably couple to the drive interconnect, thereby enabling the SDE to communicate with the selected data storage cartridge via the interposer board of the selected data storage cartridge.

5. The data storage blade of claim 3 and wherein:
each data storage cartridge of the plurality of data storage cartridges comprises a bulkhead connector; and
the robotics system comprises a carriage interconnect coupled to the SDE, the carriage interconnect configured to detachably couple to the bulkhead connector, thereby enabling the SDE to communicate with the selected data storage cartridge via the bulkhead connector of the selected data storage cartridge.

6. The data storage blade of claim 1 and wherein the plurality of data storage cartridges comprises first and second subsets of data storage cartridges, and wherein the SDE is configured to communicate with different data storage cartridges of the first subset of data storage cartridges, and configured to communicate with different data storage cartridges of the second subset of data storage cartridges.

7. The data storage blade of claim 6 and further comprising a robotics system configured to move the SDE to a selected data storage cartridge of the first subset of data storage cartridges or to a selected data storage cartridge of the second subset of data storage cartridges.

8. The data storage blade of claim 1 and wherein the controller-override mechanism comprises a solenoid that is activatable to physically separate the SDE from the plurality of data storage cartridges.

9. The data storage blade of claim 1 and wherein the SDE comprises a single system on a chip (SoC) configured to communicate with any one data storage cartridge of the plurality of data storage cartridges at a time.

10. The data storage blade of claim 1 and wherein the SDE comprises multiple SoCs with each different SoC of the multiple SoCs configured to communicate with a different data storage cartridge of the plurality of data storage cartridges in parallel.

11. The data storage blade of claim 1 and wherein the controller-override mechanism comprises a switch that is activatable to disconnect the SDE from the plurality of data storage cartridges.

12. The data storage blade of claim 1 and wherein each data storage cartridge of the plurality of data storage cartridges is vertically mounted in the data storage blade, and wherein the SDE is positioned below the vertically mounted plurality of data storage cartridges.

13. A data storage blade comprising:
a plurality of data storage devices, with each of the plurality of data storage devices comprising at least one data storage medium;
control electronics configured to control data access operations on at least one data storage device of the plurality of data storage devices, wherein the control electronics comprises firmware or software utilized to access data from the plurality of data storage cartridges, thereby physically separating storage of the firmware or software from the plurality of data storage cartridges that are configured to store user data; and
a controller-override mechanism activatable to disable communication between the control electronics and the at least one data storage device of the plurality of data storage devices in response to a detection of the firmware or software being compromised, wherein the control-override mechanism is manually activatable on the data storage blade to re-enable communication between the control electronics and the plurality of data storage cartridges.

14. The data storage blade of claim 13 and wherein the at least one data storage device of the plurality of data storage devices is a hard disc drive (HDD), and wherein the control electronics are configured to control the data access operations on the HDD.

15. The data storage blade of claim 13 and wherein each of the plurality of data storage devices is a data storage cartridge, and wherein the control electronics comprises shared drive electronics (SDE) for the plurality of data storage cartridges, and wherein the SDE is configured to control data access operations on different data storage cartridges of the plurality of data storage cartridges.

16. The data storage blade of claim 13 and wherein the data storage blade in one of a plurality of data storage blades housed in a data storage chassis.

17. The data storage device of claim 13 and wherein the controller-override mechanism comprises a solenoid that is activatable to physically separate the control electronics from the at least one data storage device.

18. A method comprising:
providing a plurality of data storage cartridges, with each of the plurality of data storage cartridges comprising at least one data storage medium;
securing the plurality of data storage cartridges to a data storage blade support;
disconnectably coupling shared drive electronics (SDE) to the plurality of data storage cartridges, the SDE configured to control data access operations on different data storage cartridges of the plurality of data storage cartridges, wherein the SDE comprises firmware or software utilized to access data from the plurality of data storage cartridges, thereby physically separating storage of the firmware or software from the plurality of data storage cartridges that are configured to store user data, and wherein the plurality of data storage cartridges, the data storage blade support and the SDE form a data storage blade; and
providing a controller-override mechanism activatable to disable communication between the SDE and the plurality of data storage cartridges in response to a detection of the firmware or software being compromised, wherein the control-override mechanism is manually activatable on the data storage blade to re-enable communication between the SDE and the plurality of data storage cartridges.

19. The method of claim 18 and further comprising providing a robotics system configured to move the SDE to a selected data storage cartridge of the plurality of data storage cartridges.

20. The method of claim 18 and further comprising including a switch of the controller-override mechanism and the SDE in a single physical unit such that the single physical unit is detachably couplable to the plurality of data storage cartridges.

* * * * *